United States Patent
Jiang et al.

(10) Patent No.: US 12,388,095 B1
(45) Date of Patent: Aug. 12, 2025

(54) SOFC OR SOEC WITH LONG-LIFE SEALING INTERFACE AND PREPARATION METHOD THEREOF

(71) Applicant: CHINA UNIVERSITY OF PETROLEUM(EAST CHINA), Qingdao (CN)

(72) Inventors: Wenchun Jiang, Qingdao (CN); Hongxiang Zheng, Qingdao (CN); Yazhou Shi, Qingdao (CN); Yun Luo, Qingdao (CN); Ming Song, Qingdao (CN); Xiucheng Zhang, Qingdao (CN)

(73) Assignee: CHINA UNIVERSITY OF PETROLEUM(EAST CHINA), Qingdao (CN)

( * ) Notice: Subject to any disclaimer, the term of this patent is extended or adjusted under 35 U.S.C. 154(b) by 0 days.

(21) Appl. No.: 19/177,919

(22) Filed: Apr. 14, 2025

(30) Foreign Application Priority Data

Oct. 9, 2024 (CN) .......................... 202411398806.0

(51) Int. Cl.
*H01M 8/0286* (2016.01)
*C25B 9/77* (2021.01)
(Continued)

(52) U.S. Cl.
CPC .............. *H01M 8/0286* (2013.01); *C25B 9/77* (2021.01); *C25B 13/07* (2021.01); *H01M 8/0282* (2013.01)

(58) Field of Classification Search
CPC .................................................. H01M 8/0286
See application file for complete search history.

(56) References Cited

U.S. PATENT DOCUMENTS

| 2011/0312482 A1* | 12/2011 | Goedeke | ................. C03C 27/10 |
| | | | 501/15 |
| 2012/0070766 A1* | 3/2012 | Braff | ..................... H01M 8/186 |
| | | | 429/498 |

(Continued)

FOREIGN PATENT DOCUMENTS

CN 116879782 A 10/2023

OTHER PUBLICATIONS

First Office Action issued in Chinese Application No. 202411398806.0; mailed Nov. 15, 2024; 13 pgs.

(Continued)

*Primary Examiner* — Brian R Ohara
(74) *Attorney, Agent, or Firm* — HAUPTMAN HAM, LLP

(57) ABSTRACT

A preparation method of an SOFC or SOEC with a long-life sealing interface is formed by allowing a sealing layer, a cell and a metal interconnector to be mutually contacted. In the present disclosure, with spinel as a coating material of the metal interconnector, staged thermal treatment is employed to form a high-density and strong-adhesion spinel coating to improve the endurance and entire performance of the metal interconnector. The present disclosure also optimizes the material system of the sealing layer, namely, uses the $SiO_2$—$MgO$—$Al_2O_3$—$SrO$—$V_2O_5$ system to prepare the sealing layer, which not only improves the resistivity of the sealing layer but also increases its hardness and fracture strength. Further, under the condition of ensuring the air-tightness, the coefficient of thermal expansion of the sealing layer is matched with the coefficients of thermal expansion of the metal interconnector and the cell, improving the endurance of the sealing interface.

6 Claims, 4 Drawing Sheets

(51) Int. Cl.
*C25B 13/07* (2021.01)
*H01M 8/0282* (2016.01)

(56) References Cited

U.S. PATENT DOCUMENTS

2016/0164114 A1* 6/2016 Kim .................. C04B 35/50
264/618
2024/0136608 A1* 4/2024 Brushett .............. H01M 8/188

OTHER PUBLICATIONS

First Search Report Office Action issued in Chinese Application No. 202411398806.0; mailed Nov. 13, 2024; 5 pgs.

Notification to Grant Patent Right for Invention issued in Chinese Application No. 202411398806.0; mailed Jan. 8, 2025; 3 pgs.

Yi, Su, "The Mechanism of Stainless Steel/BCZY-Yb Electrolyte Air Connection for Proton Ceramic Fuel Cells" (Research on Air Brazing of BCZY-Yb Ceramic to Surface Modified Ferritic Stainless Steel) ; Full-text Database of China's Outstanding Master's Degree Theses (Engineering Technology I); Mar. 15, 2022; 113 pgs. (English Abstract on pp. 6-8).

Wang, Sea-Fue; "Physical and sealing properties of BaOeAl2O3eSiO2eCaOeV2O5 glasses for solid oxide fuel cell applications"; International Journal of Hydrogen Energy; vol. 47, Issue 17; Feb. 6, 2022; pp. 10044-10055.

* cited by examiner

SOFC OR SOEC WITH LONG-LIFE SEALING INTERFACE AND PREPARATION METHOD THEREOF

RELATED APPLICATIONS

The present application claims priority from Chinese Patent Application Number 202411398806.0 filed on Oct. 9, 2024, the disclosure of which is hereby incorporated by reference herein in its entirety.

TECHNICAL FIELD

The present disclosure relates to the technical field of fuel cells, and in particular to a solid oxide fuel cell (SOFC) and solid oxide electrolysis cell (SOEC) with a long-life sealing interface and a preparation method thereof.

BACKGROUND

The solid oxide fuel cell (SOFC) and solid oxide electrolysis cell (SOEC) are widely applied to distribution power generation, mobile power packs and traffic transportations and the like due to their efficient energy conversion and low pollution emission. A cell, a sealing layer and a metal interconnector are put in mutual contact to form a sealing interface. The sealing interface is a key part for ensuring the normal working of the SOFC/SOEC stack under high temperature, and especially, the sealing interface formed by the sealing layer and the metal interconnector coating needs to have excellent thermal stability and chemical compatibility etc. to ensure the running stability and long service life of the cells. At present, the sealing interface of the SOFC/SOEC stack has the following problems which affect the service life of the stack: (1) In the SOFC/SOEC stack, the sealing layer differs greatly from the metal interconnector and the cell in coefficient of thermal expansion, which easily leads to generation of stress and cracks in high-temperature cycle, and hence to sealing failure. (2) The material of the sealing layer has insufficient chemical stability under high temperature, which easily leads to adverse reaction with the electrolyte or electrode material, and lowers the entire performance of the stack. (3) The hardness, mechanical strength and fracture toughness of the sealing layer are relatively low, which leads to poor endurance of the sealing layer and hence easily to fracturing or cracking under thermal cycle and mechanical stress. For this reason, the present disclosure provides an SOFC or SOEC with a long-life sealing interface and a preparation method thereof.

SUMMARY

In order to address the above technical problems, the present disclosure provides an SOFC or SOEC with a long-life sealing interface and a preparation method thereof.

The present disclosure employs the following technical scheme.

One of the objects of the present disclosure is to provide a preparation method of an SOFC or SOEC with a long-life sealing interface, which includes the following steps:

S1, determining a structure and a geometric size of an SOFC or SOEC stack and a composition material of each layer of structure, and preparing an SOFC or SOEC cell;

S2, selecting a substrate and a coating material of a metal interconnector and preparing the metal interconnector and applying a protective coating on a surface of the metal interconnector;

S3, based on material components and a blending ratio of a sealing layer, preparing the sealing layer of $SiO_2$—$MgO$—$Al_2O_3$—$SrO$—$V_2O_5$ system;

S4, preparing the SOFC or SOEC stack by stacking and assembling a plurality of cell units formed by the sealing layer, the cell and the metal interconnector, and then pressurizing and heating for interface sealing to obtain the SOFC or SOEC stack with a long-life sealing interface;

S5, carrying out continuous running test and thermal cycle test on the SOFC or SOEC stack prepared in the step S4 and evaluating the stability and reliability of the stack under continuous running and thermal cycle.

Furthermore, the substrate of the metal interconnector in the step S2 is 430 stainless steel or Crofer 22 APU, and the coating material is a spinel oxide coating.

Furthermore, the spinel oxide coating is at least one of nickel iron spinel, cobalt iron spinel, and manganese iron spinel.

Furthermore, the sealing layer in the step S2 is prepared by the following components with the following molar mass ratios: $SiO_2$ 40 to 50%, MgO 20 to 30%, $Al_2O_3$ 5 to 15%, SrO 5 to 15%, $V_2O_5$ 5~12%, totaling 100%.

Furthermore, the sealing layer in the step S3 includes the following components with the following molar mass ratios: $SiO_2$ 45 to 50%, MgO 25 to 30%, $Al_2O_3$ 10 to 15%, SrO 8 to 12%, $V_2O_5$ 8 to 10%, totaling 100%.

Furthermore, a leakage rate of the sealing layer in the step S3 under an SOFC or SOEC working temperature is <0.04 $sccm \cdot cm^{-1}$.

Furthermore, a coefficient-of-thermal-expansion difference of the sealing layer from the slice and the metal interconnector in the step S3 is ≤30%.

A resistivity of the sealing layer in the step S3 under the SOFC or SOEC working temperature is $\geq 10 \times 10^{11}$ $\Omega \cdot m$.

A glass transition temperature of the sealing layer in the step S3 is less than the SOFC or SOEC working temperature, with its temperature difference within 30%.

A softening temperature of the sealing layer in the step S3 is higher than the SOFC or SOEC working temperature.

A crystallization temperature of the sealing layer in the step S3 is higher than the softening temperature of the sealing layer.

Furthermore, the step S5 specifically includes the following steps:

At step S51, thermal cycle test and continuous running test are performed on the SOFC or SOEC stack prepared in the step S5 to respectively monitor a change curve of temperature, voltage and current over running time in the thermal cycle and continuous running process, and one detection is performed on open-circuit voltage, polarization curve and electrochemical impedance spectroscopy of the SOFC or SOEC stack at an interval of one thermal cycle or 100$h$ continuous running.

At step S52, based on the data recorded in the step S51, an end of life of the stack is determined. Firstly, based on the polarization curve and the electrochemical impedance spectroscopy data, a service number of thermal cycles or continuous running time corresponding to the voltage attenuating to an end-of-life threshold under a rated working current density is determined as its life; secondly, based on the open-circuit voltage of the SOFC or SOEC stack, the leakage rate in the service process is calculated and whether the leakage rate is in compliance with <0.04 $sccm \cdot cm^{-1}$ in each detection is evaluated. If in compliance, the test is continued; if not in compliance, the service number of thermal cycles or continuous running time of the SOFC or SOEC stack is recorded as its life, and a minimum thereof is selected as its end of life.

At step S53, whether the service number of thermal cycles and the continuous running time recorded in the step S52 satisfy set requirements is determined; if yes, it indicates that the stability and reliability of the SOFC or SOEC stack under the continuous running and thermal cycle are evaluated as qualified; if not, it indicates that the stability and reliability of the SOFC or SOEC stack under the continuous running and thermal cycle are evaluated as disqualified.

Further, the following step is further included:

based on the materials of the cell, the metal interconnector and the sealing layer determined in the steps S1, S2 and S3, a sealing-interface-based SOFC or SOEC stack multi-physical field calculation model is established to analyze a temperature and stress distribution law of each part in the stack and obtain a thermal cycle number at the time of a maximum of creep damage of the sealing layer reaching 0.99 or a maximum of creep damage of the sealing layer at the time of reaching a set thermal cycle number, and evaluate whether the sealing performance of the sealing interface satisfies set requirements. If the set requirements are satisfied, the steps S4 and S5 are performed, and if the set requirements are not satisfied, the step S3 is repeated to adjust the material blending ratio of the sealing layer.

Another object of the present disclosure is to provide an SOFC or SOEC with a long-life sealing interface.

The present disclosure has the beneficial effects.

(1) The present disclosure provides an SOFC or SOEC with a long-life sealing interface and a preparation method thereof. With the spinel as a coating material of the metal interconnector, staged thermal treatment is employed to form a high-density and strong-adhesion spinel coating, whose excellent oxidation resistance, chemical stability and electric conductivity greatly improve the endurance and entire performance of the metal interconnector. The material system of the sealing layer is $SiO_2$—$MgO$—$Al_2O_3$—$SrO$—$V_2O_5$, in which a proper amount of $V_2O_5$ is added and ratios of SrO and $V_2O_5$ are controlled, which not only improves the resistivity of the sealing layer but also increases the hardness and fracture strength of the sealing layer, so as to improve the endurance of the sealing interface. Furthermore, by controlling the ratio of $V_2O_5$, the coefficient of thermal expansion and the airtightness of the sealing layer are also adjusted, which ensures the sealing layer will not leak in the service process, avoiding damage to the stack; also, the coefficient of thermal expansion of the sealing layer matches the coefficients of thermal expansion of the metal interconnector and the cell, avoiding the stress and damage resulting from mismatch of the coefficients of thermal expansion.

(2) The present disclosure provides an SOFC or SOEC with a long-life sealing interface and a preparation method thereof. The material system of the sealing layer is $SiO_2$—$MgO$—$Al_2O_3$—$SrO$—$V_2O_5$. The crystallization temperature and peak crystallization temperature of the sealing layer prepared with the system both are greater than the working temperature of the stack, which avoids excessive crystallization under the working temperature and thus ensures its stability and mechanical strength. The softening temperature of the sealing layer is higher than the SOFC working temperature, which ensures the sealing layer will not flow or deform under the working temperature and can maintain its structural stability and airtightness. In addition, the glass transition temperature of the sealing layer is slightly lower than or close to the SOFC working temperature, so that the sealing layer can better adapt to the deformation arising from thermal expansion difference, so as to maintain good airtightness and provide good sealing environment for the stack.

BRIEF DESCRIPTIONS OF THE DRAWINGS

In order to clearly describe the technical solutions in the embodiments of the present disclosure or in the prior arts, drawings required for descriptions of the embodiments or the prior arts will be briefly introduced. Apparently, the drawings described hereunder are some embodiments of the present disclosure, and other drawings can also be obtained by those skilled in the arts based on these drawings without carrying out creative work.

Figure 1:
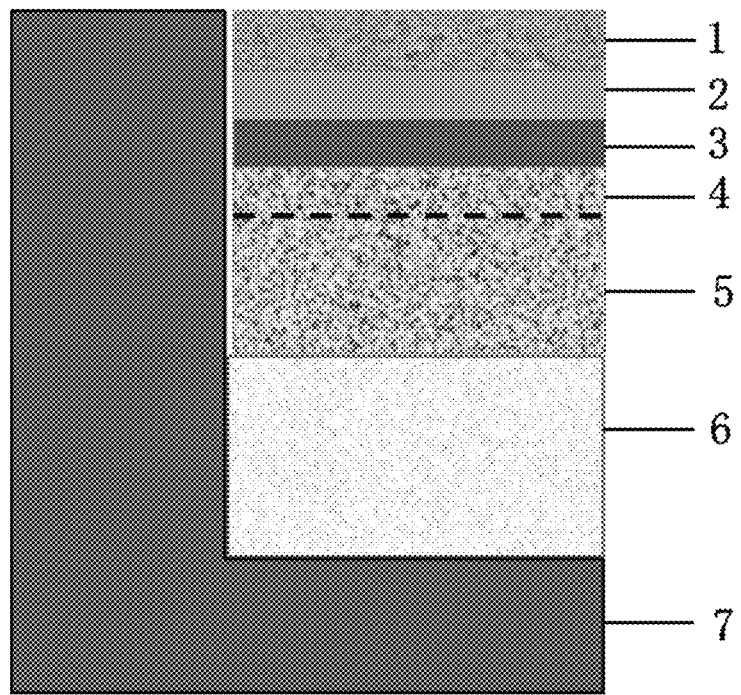
FIG. 1 is a schematic diagram illustrating a local structure of an SOFC single-layer stack prepared in an embodiment 1 of the present disclosure.

Numerals of the drawings are described below: 1. cathode layer, 2. blocking layer, 3. electrolyte layer, 4. anode functional layer, 5. anode support layer, 6. sealing layer, 7. metal interconnector and 8. cell.

DETAILED DESCRIPTIONS OF EMBODIMENTS

The present disclosure provides an SOFC or SOEC with long-life sealing interface and a preparation method thereof. In order to make the objects, the technical schemes and effects of the present disclosure clearer and more definite, the present disclosure will be further detailed below. It should be understood that the specific embodiments described herein are used only to interpret the present disclosure rather than to limit the present disclosure.

The present disclosure will be detailed below in combination with drawings.

Embodiment 1

This embodiment provides a solid oxide fuel cell with a long-life sealing interface, with its preparation process shown below.

At step S1, the cell is prepared based on the structure of the cell of the SOFC and the composition materials of each layer of structure.

Specifically, the structure and the materials of the cell of this embodiment are shown in Table 1.

TABLE 1

| SOFC cell | Materials | Thickness (μm) | Coefficient of thermal expansion ($10^{-6}$ $K^{-1}$) |
|---|---|---|---|
| Cathode layer | LSM [$La_{0.65}Sr_{0.35}MnO_{3-\delta}$] | 20 | 13.4 |
| Blocking layer | GDC [$Ce_{0.9}Gd_{0.1}O_{1.95}$] | 10 | 11.6 |
| Electrolyte layer | YSZ [$(Y_2O_3)_{0.08}(ZrO_2)_{0.92}$] | 10 | 10.8 |
| Anode functional layer(AFL) | NiO-8YSZ/Ni-8YSZ | 10 | 14.8 |
| Anode support layer(ASL) | NiO-3YSZ/Ni-3YSZ | 400 | 13.6 |

At step S2, the substrate and the coating material of the metal interconnector are selected, and a protective coating is applied to the surface of the metal interconnector.

Specifically, in this embodiment, the substrate of the metal interconnector is Crofer 22 APU with a thickness of 4000 μm, and the coating material is nickel iron spinel. The steps of applying the protective coating to the surface of the metal interconnector are shown below.

(1) Surface treatment is carried out on the substrate of the metal interconnector by mechanical polishing, acid wash, plasma cleaning and the like to remove oxide and impurities on the surface of the substrate of the metal interconnector.

(2) Solutions of nickel nitrate ($Ni(NO_3)_2 \cdot 6H_2O$) and ferric nitrate ($Fe(NO_3)_3 \cdot 9H_2O$) are prepared such that a molar ratio of nickel nitrate to ferric nitrate is 1:2; the nickel nitrate solution and the ferric nitrate solution are mixed and stirred uniformly; the mixture solution is treated with sol-gel method; the pH value of the mixture solution is adjusted to 9.0 to 11.0 by adding ammonia water or ethanolamine to promote solution gelatinization, and then the mixture solution is stood or heated until a gel is formed. The formed gel is dried under the temperature of 80 to 100° C. to remove moisture and then the dried gel powder is calcined under the temperature of 600 to 800° C. to form an $NiFe_2O_4$ coating material with spinel structure.

(3) The $NiFe_2O_4$ coating material power with spinel structure is dispersed in a spray solvent to prepare a suspension; the suspension is sprayed by a spray gun to the surface of the substrate of the metal interconnector uniformly, with the coating thickness controlled to 10 to 50 microns, specifically to 30 microns in this embodiment, so as to ensure the mechanical strength and electrochemical performance of the coating.

(4) Staged thermal treatment is performed on the spinel-coated substrate of the metal interconnector to form a dense spinel oxide coating, which specifically includes the following steps.

First-stage thermal treatment (pre-sintering): it is performed in a protective atmosphere (e.g. nitrogen or inert gas), with a thermal treatment temperature set to 600° C. to 800° C., a heating rate set to 1 to 3° C./min and a thermal treatment time set to 1 to 3 h, so as to preliminarily cure the coating and form a spinel phase.

Second-stage thermal treatment (post-sintering): it is performed in a static air, with the thermal treatment temperature set to 1000° C. to 1200° C., the heating rate set to 1 to 3° C./min and the thermal treatment time set to 2 to 4 h, so as to form a dense spinel oxide layer and optimize the structure of the spinel phase.

Cooling: after thermal treatment is completed, slow cooling is performed to room temperature to reduce a thermal stress and maintain the coating integrity.

Specifically, in this embodiment, in a thermal treatment furnace with nitrogen atmosphere, the spinel-coated substrate of the metal interconnector is heated at the heating rate of 2° C./min from room temperature to 700° C. and held for 120 minutes; after the holding is ended, the introduction of nitrogen is stopped and then the substrate is heated at the heating rate of 2° C./min from 700° C. to 1100° C. and held for 180 minutes; finally, the spinel-coated substrate of the metal interconnector is cooled naturally to room temperature.

At step S3, based on the material components and the blending ratio of the sealing layer, the sealing layer of $SiO_2$—MgO—$Al_2O_3$—SrO—$V_2O_5$ system is prepared.

Specifically, in this embodiment, in order to study the performances of the sealing layers with different component blending ratios, 7 sealing layers are prepared, with the material components and blending ratios shown in Table 2 below.

TABLE 2

| Sealing layer samples | $SiO_2$ | MgO | $Al_2O_3$ | SrO | $V_2O_5$ |
|---|---|---|---|---|---|
| A0 | 45.00 | 25.00 | 10.00 | 20.00 | 0 |
| A1 | 45.00 | 25.00 | 10.00 | 19.00 | 1.00 |
| A3 | 45.00 | 25.00 | 10.00 | 17.00 | 3.00 |
| A5 | 45.00 | 25.00 | 10.00 | 15.00 | 5.00 |
| A10 | 45.00 | 25.00 | 10.00 | 10.00 | 10.00 |
| A15 | 45.00 | 25.00 | 10.00 | 5.00 | 15.00 |
| A20 | 45.00 | 25.00 | 10.00 | 0.00 | 20.00 |

Based on the material components and blending ratios of the above sealing layers, the sealing layers are prepared in the following process.

(1) Firstly, the raw materials $SiO_2$, MgO, $Al_2O_3$, SrO, $V_2O_5$ are mixed uniformly based on the molar ratios in the Table 2, totaling 100 mol %.

(2) after mixed uniformly, the raw materials are held for 1 to 2 hours under the temperature of 1300 to 1400° C. for melting. In this embodiment, they are held for 2 h under the temperature of 1400° C. to produce a glass frit, which is then crushed, ground or ball-milled after being quenched. A glass powder with a particle size of ≤30-45 μm is obtained by screening.

(3) The glass powder is mixed with a solvent, a binder, a plasticizer, a dispersant and a defoamer at a mass ratio of 2.5 to 3.5:1:1:1:1 to produce a glass sealing raw material. In this embodiment, the ratio is 3:1:1:1:1. Then, the glass sealing raw material is ball-milled for 12 to 24 hours by a planetary ball mill to uniform dispersion to obtain a stable sealing layer slurry with good flowability and proper viscosity. The above solvent is deionized water, or ethanol (e.g. 99% ethanol); the binder is polyvinyl alcohol (PVA) or poly methyl cellulose (PMMA); the plasticizer is phthalate or polyvinyl alcohol ether; the dispersant is polyvinyl alcohol (PVA), or polyether (e.g. Triton X-100); the defoamer is silicon-based defoamer.

(4) Vacuum degassing is performed on the sealing layer slurry and then poured into a slurry tank, and formed into a rough cast product with uniform thickness by a casting machine, and then dried for 24 hours to obtain a cast sheet with a thickness of about 0.4 mm, and naturally dried.

(5) The dried sealing layer cast sheet is placed on a cutting device and cut into corresponding shape and size based on the requirements of SOFC/SOEC stack.

(6) The cut sealing layer is sintered: firstly, it is heated to 200° C. at the heating rate of 1 to 3° C./min, and held for 30 minutes; then, it is heated from 200° C. to 450° C. at the heating rate of 1 to 3° C./min, and held for 30 minutes; then it is heated from 450° C. to 800 to 1000° C. at the heating rate of 0.5 to 2° C./min, and held for 180 minutes; after the sintering is completed, it is cooled to room temperature at the cooling rate of 0.5 to 2° C./min. Specifically, in this embodiment, it is firstly heated from room temperature to 200° C. at the heating rate of 2° C./min and held for 30 minutes; then it is heated from 200° C. to 450° C. at the heating rate of 2° C./min and held for 30 minutes; then, it is heated from 450° C. to 850° C. at the heating rate of 1° C./min and held for 180 minutes; after the sintering is completed, it is cooled to room temperature at the cooling rate of 1° C./min.

Performance test and evaluation are performed on the above prepared sealing layer samples, which mainly include differential thermal analysis test, coefficient of thermal expansion test, resistivity test and Vickers hardness test to obtain the glass transition temperature (Tg), the softening temperature (Tf), the crystallization temperature (Tc), the peak crystallization temperature (Tp), the Vickers hardness, and the fracture toughness, as well as the coefficient of thermal expansion and the resistivity under the working temperature of 750° C. In addition, test is also performed on the coefficient of thermal expansion of the metal interconnector and the cell.

Specifically, each test process above is shown below.

(a) Coefficient of Thermal Expansion Test

During the coefficient of thermal expansion (CTE) test process, the sample is placed in a thermomechanical analyzer (TMA) or differential thermal dilatometer; after the equipment is calibrated in length and temperature, the temperature program from room temperature to maximum temperature is set and a proper gas atmosphere (e.g. air, nitrogen or argon) is selected. Expansion measurement is carried out at the heating rate of 5° C./min in the air atmosphere and a change curve of the length of the samples along with temperature is recorded to calculate the coefficient of thermal expansion. The CTE value is determined based on a slope of the expansion curve within the temperature range of 25 to 800° C.

(b) Differential Thermal Analysis Test

By using a simultaneous thermal analyzer, the glass transition temperature (Tg), the softening temperature (Tf), the crystallization temperature (Tc) and the peak crystallization temperature (Tp) of the glass sealing layer are determined. The test temperature is 0 to 1200° C., the heating rate is 15° C./min, and the test gas atmosphere is air.

The glass transition temperature (Tg) is a temperature at which the glass material changes from glass state to rubber state; the softening temperature (Tf) is a temperature at which the material starts to soften and lose its rigidity as well as an important indicator that the material changes from solid state to flow state; the crystallization temperature (Tc) is a temperature at which the glass material starts to precipitate crystal phase during the cooling process; the peak crystallization temperature (Tp) is a temperature at which the crystal phase generation rate reaches a maximum when the glass or glass ceramic material is heated or cooled.

(c) Resistivity Test

By using Zahner electrochemical working station or standard four-point probe method, the resistivity of the glass under different temperatures is measured. The test condition is that 2V voltage is applied in the air and the temperature range is 25 to 800° C.

(d) Vickers Hardness and Fracture Toughness Test

The Vickers hardness of the sealing layer sample is measured by a micro hardness tester with diamond indenter. A load of ION is applied to the polished sample, and held for 15 s. 10 measurements are carried out on each sample to calculate an average value.

The Vickers hardness and the fracture toughness can be calculated by measuring an indentation size and a tip crack propagation length in the following formula:

$$HV = \frac{7.416 \cdot F}{(d_1 + d_2)^2}$$

$$K_{IC} = \gamma \left(\frac{E}{HV}\right)^{0.5} \left(\frac{F}{\tau^{1.5}}\right)$$

where HV is a Vickers hardness (GPa); F is an applied loading force (N); $d_1$ and $d_2$ are diagonal lengths of the indentation (m) respectively; $K_{IC}$ is a fracture toughness (MPa·m$^{1/2}$); $\gamma$ is a Vickers indenter constant equal to 0.016; E is an elastic modulus (GPa); $\tau$ is an average radial crack length measured from the center of the indentation (m).

(e) Airtightness Test

The airtightness of the sealing material is represented by leakage rate. The leakage rate is defined as a leakage flowrate running through one unit length of sealing material, measured by the unit of sccm·cm$^{-1}$. The sealing performance test apparatus is composed of a temperature control system, a pressurizing system and a measurement air circuit system. The temperature control system includes a muffle furnace, a K type thermocouple, and a programmable temperature controller. The pressurizing system is a pneumatic hydraulic system. The measurement air circuit system includes an air source, a relief valve, a pneumatic value-fixing valve, a capsule pressure gauge, a flowmeter, a sealing chamber, and a connection hose. A sealing layer sample with a uniform thickness is selected and cut into a hollow-square-shaped sample with an outer side length of 110 mm×110 mm and an inner side length of 100 mm×100 mm. The hollow-square-shaped sealing layer sample is fixed between two steel plates to form a sealing chamber, in which the volume of the gas storage tank is 200 cm³. The surfaces of the sealing layer sample combined with the steel plates are applied with a high-temperature adhesive to ensure close attachment. The heating rate is 1° C./min, the test gas is air, the external load is 0.25 MPa, and the gas introduction pressure is 10.3 kPa. During the test, the gas enters the sealing chamber through a measurement air circuit. When the pressure in the sealing chamber reaches a set value, the gas stops entering, and can continue entering the sealing chamber only at the time of the pressure attenuation resulting from gas leakage. The leakage can be reflected by the reading of the flowmeter. The leakage rate can be calculated by measuring a time in which the pressure drops to 2.1 kPa.
The calculation formula of the leakage rate is:

$$L_{sealing\ layer} = \frac{(P_f - P_i)V}{CP_i(t_f - t_i)}$$

where $P_f$ and $P_i$ are gas pressures of test end and test start respectively, $t_f$ and $t_i$ are times of test end and test staff, C is an outer perimeter of the to-be-measured sealing layer sample, V is a volume of the gas storage tank. Each test result above is shown in Table 3.

TABLE 3

| SOFC Stack structure | Sealing layer material | | | | | | | Anode support layer | Crofer 22APU |
|---|---|---|---|---|---|---|---|---|---|
| | A0 | A1 | A3 | A5 | A10 | A15 | A20 | | |
| Coefficient of thermal expansion ($1 \times 10^{-6} K^{-1}$) | 9.483 | 10.216 | 10.512 | 11.697 | 12.468 | 13.303 | 13.724 | 13.6 | 11.5 |
| Glass transition temperature Tg(° C.) | 602.6 | 604.1 | 633 | 663.2 | 676.6 | 658.2 | 628.2 | / | / |
| Softening temperature Tf (° C.) | 796 | 805 | 813 | 817 | 814 | 807 | 804 | / | / |
| Crystallization temperature Tc (° C.) | 874 | 885 | 924 | 959 | 983 | 970 | 928 | / | / |
| Peak crystallization temperature Tp (° C.) | 947 | 974 | 1013 | 1036 | 1086 | 1049 | 1013 | / | / |
| Vickers hardness (GPa) | 5.3 | 5.9 | 6.1 | 6.4 | 10.52 | 7.73 | 6.95 | / | / |
| Fracture toughness (MPa · m$^{1/2}$) | 0.304 | 0.46 | 0.65 | 1.12 | 1.276 | 1.332 | 1.104 | / | / |
| Resistivity ($1 \times 10^{11}$ Ω · m) | 7.67 | 8.22 | 8.77 | 9.32 | 12.92 | 10.42 | 9.87 | / | / |
| Leakage rate (sccm · cm$^{-1}$) | 0.010 | 0.006 | 0.004 | 0.003 | 0.002 | 0.003 | 0.004 | / | / |

In these parameters of the coefficient of thermal expansion, the glass transition temperature (Tg), the softening temperature (Tf) ° C., the crystallization temperature (Tc), the peak crystallization temperature (Tp), the Vickers hardness, the fracture toughness, the resistivity and the leakage rate, the thermal expansion performance matching of the sealing material with the cell and the metal interconnector and the airtightness of the sealing material are the most crucial. The thermal expansion matching of the sealing material with the cell and the metal interconnector plays an extremely important role in avoiding the stress and damage under the high-temperature working environment. Therefore, it is necessary to ensure the coefficient of thermal expansion difference between the sealing layer and the anode support layer and the metal interconnector is ≤30%, so as to avoid the stress and damage resulting from thermal expansion mismatching. The airtightness directly determines whether a leakage leading to stack damage may occur in the service process. The airtightness of the sealing material is represented by the leakage rate, and the leakage rate must satisfy <0.04 sccm·cm$^{-1}$ under the working temperature. Secondly, the resistivity is also a significantly important parameter. The low resistivity helps to reduce the electric energy loss and improve the cell efficiency. But, in order to guarantee the insulation performance of the sealing material, the resistivity must be ≥10×10$^{11}$ Ω·m. Thirdly, the Vickers hardness and the fracture toughness are important parameters for guaranteeing the stack endurance. The higher hardness can help improve the endurance of the material but the relationship of the hardness and the sealing performance must be balanced. The higher fracture toughness can prevent occurrence of cracking and fracturing under the thermal cycle and the mechanical stress. Furthermore, the glass transition temperature (Tg), the softening temperature (Tf), the crystallization temperature (Tc) and the peak crystallization temperature (Tp) of the sealing material must be matched with the working temperature of the SOFC/SOEC stack to ensure the sealing integrity, which is of great significance for maintaining long-term mechanical stability, airtightness and endurance of the SOFC system during the high-temperature operation and thermal cycle. The glass transition temperature (Tg) slightly lower than or close to the working temperature of the SOFC/SOEC stack can guarantee the material has sufficient elasticity to adapt to thermal expansion rather than excessively softening. On the contrary, the glass transition temperature (Tg) higher than the working temperature may cause the sealing interface to become brittle and suffer more stress, leading to risk of failure. The softening temperature (Tf) higher than the working temperature of the SOFC/SOEC stack is extremely important for preventing material flow. But, the softening temperature (Tf), when too close to the working temperature or excessively low, will lead to deformation and leakage. Finally, the crystallization temperature (Tc) and the peak crystallization temperature (Tp) must exceed the working temperature of the SOFC/SOEC stack to avoid unnecessary crystallization.

By carrying out comprehensive analysis on the test results of Table 3, the comprehensive performance of the sealing layer sample A10 is regarded as optimal.

At step S4, the sealing layer, the cell and the metal interconnector are stacked and assembled and then pressurized and heated to complete interface sealing so as to obtain a single-layer SOFC stack with long-life sealing interface, as shown in FIG. 1.

Specifically, the step can include the following steps.

At step S41, the sealing layer cast sheet prepared in the step S3 is placed on the cutting device and cut into a hollow-square-shaped sealing layer 1 and a hollow-square-shaped sealing layer 2 based on the assembling requirements of the SOFC stack.

At step S42, the anode-side metal interconnector is placed on an SOFC stack assembling platform, and the hollow-square-shaped sealing layer 1 is placed in a PEN recess in the middle of the metal interconnector, and the hollow-square-shaped sealing layer 2 is placed around the metal interconnector, where the width of the sealing layer is 10 cm.

At step S43, glass glue is applied to the remaining exposed part of the metal interconnector to prevent short circuiting due to direct contact of the adjacent metal interconnector.

At step S44, The cell is placed on an upper part of the sealing layer 1, with an anode support layer of the cell facing down and a cathode side facing up; the same sealing layer 1 is placed on an upper part of the cell cathode side, and the cathode side metal interconnector is placed on an upper part of the hollow-square-shaped sealing layer 2, ensuring the cell can be accommodated in a gap between the middles of two metal interconnectors and maintaining the upper and lower surfaces of the cell in close contact with the metal interconnectors.

At step S45, the stacked SOFC stack is placed in a sintering furnace and a pressure of 0.14 Mpa is applied to the SOFC stack with a gas cylinder and a pressure rod, and then the SOFC/SOEC stack is heated and sintered by using the sintering furnace to ensure the sealing layer is bonded with the cell and the metal interconnector so as to complete interface sealing. The above sintering process is the same as the step S3.

At step S5, the stability and reliability of the single-layer SOFC prepared in the step S4 under continuous running and thermal cycle are evaluated in the following steps.

At step S51, thermal cycle test and continuous running test are performed on the SOFC stack prepared in the step S4 to respectively monitor a change curve of temperature, voltage and current over running time in the thermal cycle and continuous running process, and one detection is performed on open-circuit voltage, polarization curve and electrochemical impedance spectroscopy of the SOFC stack at an interval of one thermal cycle or 100h continuous running.

At step S52, based on the data recorded in the step S51, an end of life of the stack is determined. Firstly, based on the polarization curve and the electrochemical impedance spectroscopy data, a service number of thermal cycles or continuous running time corresponding to the voltage attenuating to an end-of-life threshold under a rated working current density is determined as its life, where the end-of-life threshold is usually set to 20% of an initial voltage; secondly, based on the open-circuit voltage of the SOFC stack, the leakage rate in the service process is calculated and whether the leakage rate is in compliance with <0.04 sccm·cm$^{-1}$ in each detection is evaluated. If in compliance, the test is continued; if not in compliance, the service number of thermal cycles or continuous running time of the SOFC stack is recorded as its life, and a minimum thereof is selected as its end of life.

Specifically, the process of calculating the leakage rate in the service process based on the open-circuit voltage (OCV) is as shown below:

The relationship of the open-circuit voltage of the SOFC/SOEC stack and gas partial pressure satisfies the Nernst equation:

$$E_{OCV} = E_{Nernst}^0 - \frac{RT}{nF}\ln\left(\frac{P_{O_2(cathode)}}{P_{O_2(anode)}}\right)$$

where $E_{OCV}$ is an open-circuit voltage of the SOFC, $E_{Nernst}^0$ is a standard electrode potential, R is a universal gas constant, and R=8.314 J/(mol·K); T is an absolute temperature (K), F is a Faraday constant (96485 C/mol); n is a number of electrons (for oxygen reduction/oxidation reaction, n is 4); $P_{O_2(cathode)}$ and $P_{O_2(anode)}$ respectively are oxygen partial pressures of cathode and anode; the cathode introduces the air, and the partial pressure of oxygen of the cathode side is the partial pressure 0.21 atm of oxygen in the air.

The gas leakage can lead to change of gas partial pressures of anode and cathode and thus affect the OCV. If the oxygen leaks from the cathode to the anode, the leakage increases the partial pressure of oxygen of the anode and thus lowers the OCV. By measuring the difference between the actual OCV and the theoretical OCV, the leakage rate can be evaluated. Theoretically, the OCV under no leakage is:

$$E_{OCV,theoretical} = E_{Nernst}^0 - \frac{RT}{nF}\ln\left(\frac{P_{O_2(cathode)}}{P_{O_2(anode,0)}}\right)$$

where $P_{O_2(anode,0)}$ is a partial pressure of oxygen of the anode under no leakage.

Due to presenece of the leakage, the actually-measured OCV is:

$$E_{OCV,measured} = E_{Nernst}^0 - \frac{RT}{nF}\ln\left(\frac{P_{O_2(cathode)}}{P_{O_2(anode,leak)}}\right)$$

where $P_{O_2(anode,leak)}$ is a partial pressure of oxygen of the anode under leakage.

Based on the difference between the actual OCV and the theoretical OCV, the partial pressure of the leaking oxygen can be calculated. The partial pressure of oxygen of the anode under leakage is:

$$P_{O_2(anode,leak)} = \frac{P_{O_2(cathode)}}{\exp\left(\frac{nF}{RT}(E_{OCV,theoretical} - E_{OCV,measured})\right)}$$

The leakage rate is calculated in the following formula:

$$L_{stack} = \frac{\Delta v}{\Delta t} = \frac{v \cdot (P_{O_2(anode,leak)} - P_{O_2(anode,0)})}{\Delta t}$$

where v is an anode-side volume, and $\Delta t$ is a measurement time.

At step S53, whether the service number of thermal cycles and the continuous running time recorded in the step S52 satisfy set requirements is determined; if yes, it indicates that the stability and reliability of the SOFC stack under the continuous running and thermal cycle are evaluated as qualified; if not, it indicates that the stability and reliability of the SOFC stack under the continuous running and thermal cycle are evaluated as disqualified.

Specifically, in this embodiment, the sealing layer samples of A10, A0, A5 and A15 are respectively selected to prepare corresponding single-layer SOFC stacks. Taking the thermal cycle test as example, it is usually required that the thermal cycle life of the SOFC stack in the commercialized operation is at least 20 cycles. The working conditions of the thermal cycle test are as below: the working temperature 750° C., the anode fuel gas 0.5 L/min/sheet, and the fuel utilization rate 65.02%. Specifically, during the thermal cycle test, the SOFC stack is mounted in an electric heating furnace and gradually heated to a reduction temperature and a working temperature; when the temperature increases the working temperature of 750° C., the performance of the SOFC stack is evaluated. The electrochemical performance of the SOFC stack is measured by using a fuel cell test system equipped with temperature, electric load and gas flowrate controllers, and the power density of the cell is obtained by the current-voltage (I-V) curve under the working temperature. Furthermore, after the SOFC/SOEC stack is heated from room temperature to 750° C. and completes reduction process, a polarization curve of the SOFC/SOEC stack from 0 mA/cm$^2$ to 450 mA/cm$^2$ current density is measured by using a direct current electronic load (IT8814B, ITECH). Gamry Reference 3000AE electrochemical working station is used to monitor the electrochemical impedance spectroscopy (EIS) of the cell under the open-circuit state, where the frequency range is 10 mHz to 100 kHz. After the test is completed, the stack continuously runs for 12 to 48 hours under the load of 300 mA/cm$^2$ current density to evaluate the stability of its output voltage. Next, it is cooled to room temperature at the cooling rate of 0.5° C.·min$^{-1}$, completing one cycle. Further, one detection is carried out on the open-circuit voltage, the polarization curve and the electrochemical impedance spectroscopy of the SOFC stack at an interval of one thermal cycle. In the last thermal cycle, when the electric heating furnace is cooled to 150° C., the power supply and the hydrogen supply are cut off; when the temperature is cooled to room temperature, the tooling is dismounted.

The service number of thermal cycles and the voltage attenuation rate of the single-layer SOFC stacks prepared using the sealing layer samples A10, A0, A5 and A15 respectively are obtained by test as shown in Table 4. The determination basis of the life of the four single-layer stacks is "the voltage under the load of 300 mA/cm$^2$ current density attenuates to 20% of the initial voltage".

TABLE 4

| Sealing layer type of single-layer stack | Service life of thermal cycles | Attenuation rate of open-circuit voltage |
| --- | --- | --- |
| A10 | 30 | 2.6711% |
| A0 | 5 | 13.9749% |
| A5 | 10 | 5.8528% |
| A15 | 7 | 15.1464% |

Notes: The open-circuit voltage is an important parameter for evaluating the SOFC performance, which is usually equal to the theoretical potential of the cell unless electrolyte leakage occurs. When the actual open-circuit voltage is lower than the theoretical value of the open-circuit voltage, it indicates that sealing leakage may occur. When there is only tiny leakage, the stack can still work normally; when the leakage rate is up to 0.04 sccm-cm$^{-1}$, the stack will fail to work normally.

Figure 2:
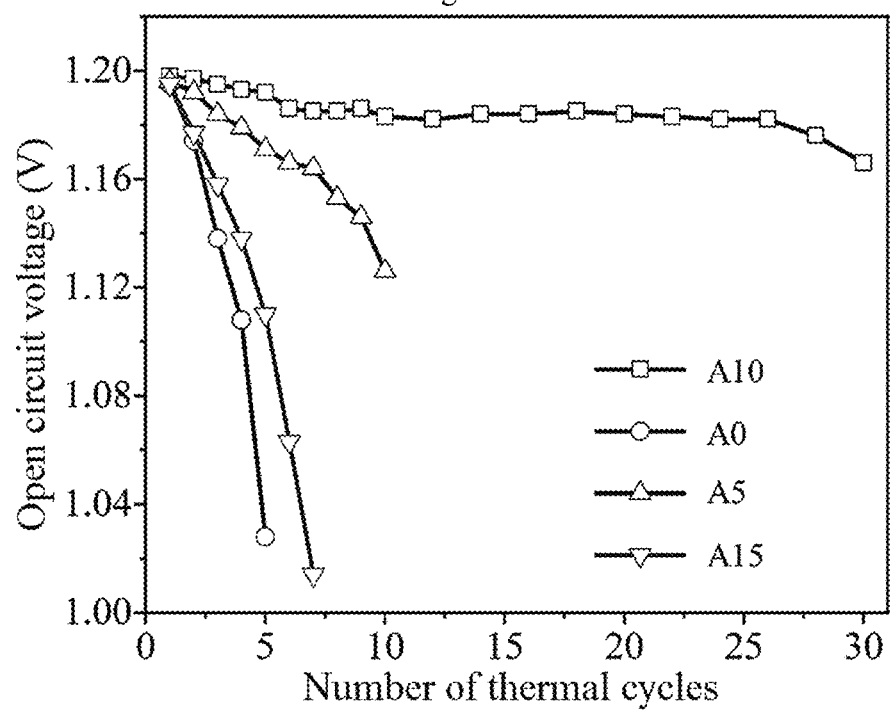
FIG. 2 is a change curve of an open-circuit voltage of a prepared SOFC stack in a thermal cycle in the embodiment 1 of the present disclosure.

As shown in FIG. 2, along with the progress of the thermal cycle, the open-circuit voltages of four SOFCs entirely present a change law of gradual drop. After the SOFC stack prepared using the A10 sealing layer runs through 30 thermal cycles, the voltage attenuation rate under the open-circuit voltage is 2.6711%; after the SOFC stack prepared using the A0 sealing layer runs through 5 thermal cycles, the voltage attenuation rate under the open-circuit voltage is 13.9749%; after the SOFC stack prepared using the A5 sealing layer runs through 10 thermal cycles, the voltage attenuation rate under the open-circuit voltage is 5.8528%; after the SOFC stack prepared using the A15 sealing layer runs through 7 thermal cycles, the voltage attenuation rate under the open-circuit voltage is 15.1464%; the voltage attenuation rates of the SOFC stacks prepared using A10, A0, A5 and A15 sealing layers under an average open-circuit voltage are 0.0921%/cycle, 3.4937%/cycle, 0.6503%/cycle and 3.7866%/cycle.

It is tested that when the sealing layer is A10 sample, the service number of thermal cycles satisfies the requirements, and when the sealing layer is A0, A5, and A15, none of the service numbers of thermal cycles satisfies the requirements.

Figure 3:
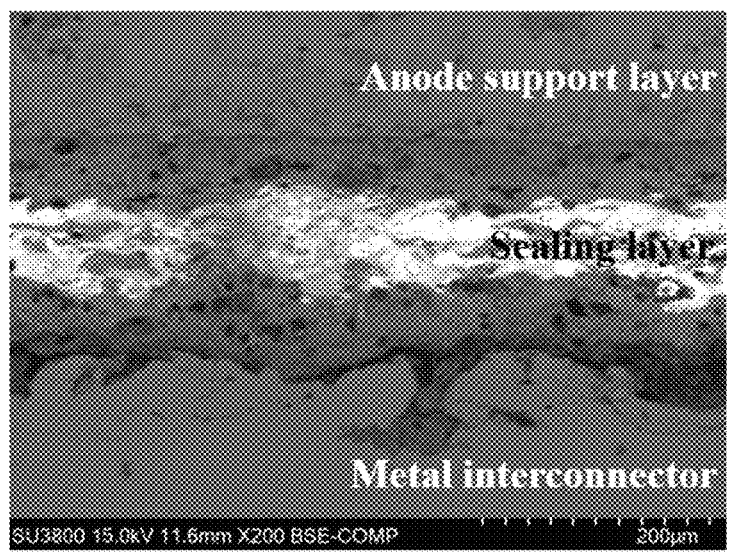
FIG. 3 is a microstructure of a sealing interface of a prepared SOFC stack with A10 sealing layer after 30 thermal cycles in the embodiment 1 of the present disclosure.
Figure 4:
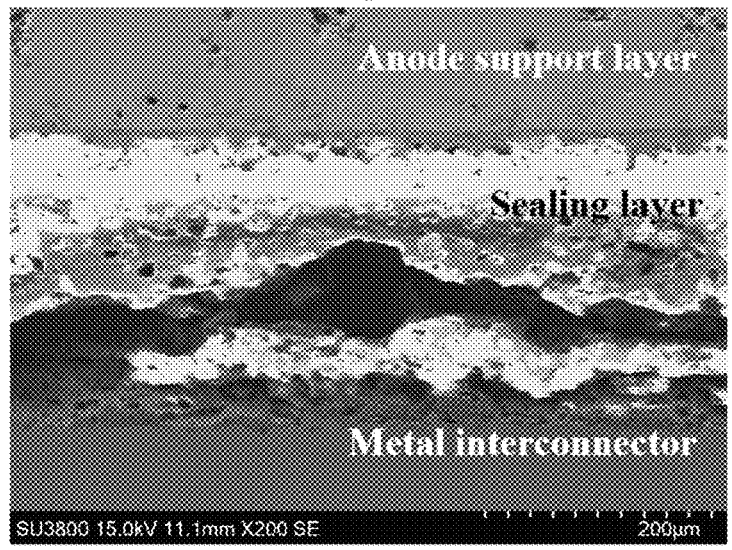
FIG. 4 is a microstructure of a sealing interface of a prepared SOFC stack with A0 sealing layer after 5 thermal cycles in the embodiment 1 of the present disclosure.
Figure 5:
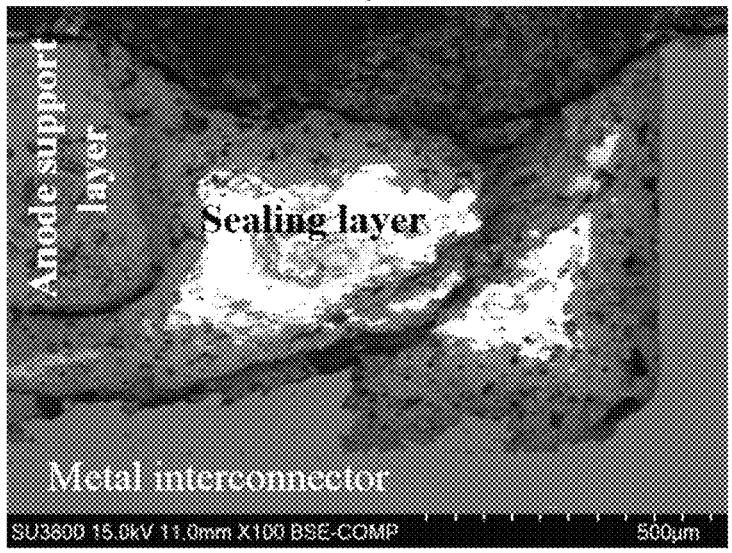
FIG. 5 is a microstructure of a sealing interface of a prepared SOFC stack with A15 sealing layer after 10 thermal cycles in the embodiment 1 of the present disclosure.

In addition, detection is carried out on the microstructure of the sealing interface of the single-layer SOFC stack prepared with the A10 sealing layer after 30 thermal cycles, as shown in FIG. 3; detection is carried out on the microstructure of the sealing interface of the single-layer SOFC stack prepared with the A0 sealing layer after 5 thermal cycles, as shown in FIG. 4; detection is carried out on the microstructure of the sealing interface of the single-layer SOFC stack prepared with the A15 sealing layer after 7 thermal cycles, as shown in FIG. 5. From the FIGS. 3, 4, and 5, it can be seen that when the single-layer SOFC stack prepared with the A10 sealing layer fails after 30 thermal cycles, its sealing interface only has tiny cracks on the contact interface position of the sealing layer with the metal interconnector; when the single-layer SOFC stack prepared with the A0 sealing layer fails after 5 thermal cycles, its sealing interface has large cracks and even severe cracks between the sealing layer and the metal interconnector; when the single-layer SOFC stack prepared with the A15 sealing layer fails after 7 thermal cycles, its sealing interface has severe cracks which penetrate through the entire sealing layer, posing leaking risk.

Embodiment 2

This embodiment differs from the embodiment 1 in that in this embodiment, before the step S4 is performed, a sealing interface-based SOFC or SOEC stack multi-physical field calculation model is established based on the materials of the cell, the metal interconnector and the sealing layer determined in the steps S2, S2 and S3, and the temperature and stress distribution law, the creep strain and the creep damage of each part in the stack are analyzed, and whether the sealing performance of the sealing interface satisfies the set requirements is evaluated. If the set requirements are satisfied, the steps S4 and S5 are performed; if the set requirements are not satisfied, the step S3 is performed to adjust the material blending ratio of the sealing layer. Detailed descriptions are made below.

Figure 6:
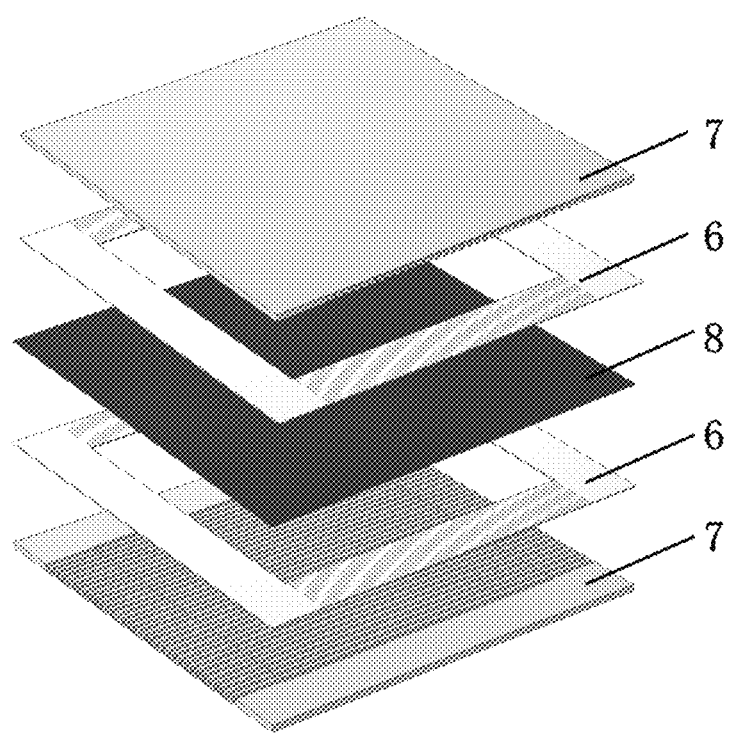
FIG. 6 is a multi-physical field calculation model of an SOFC stack established in an embodiment 2 of the present disclosure.

(1) Based on the structure of the SOFC stack, the SOFC stack multi-physical field calculation model coupling electrochemistry, heat transfer, flow and mass transfer is established by COMSOL Multiphysics finite element software, as shown in FIG. 6. The material parameters and geometric parameters of the SOFC stack and the sealing interface are set, and a control equation about electrochemistry, heat transfer, flow and mass transfer is set, and a boundary condition and assumption condition required for finite element simulation are set based on actual working conditions.

(2) Finite element simulation calculation is performed in the COMSOL Multiphysics finite element software to obtain the temperature field distribution of the entire SOFC stack and the sealing layer.

(3) Based on the temperature field distribution obtained in the step (2), solid mechanics analysis is performed on the SOFC stack to obtain the stress field distribution of the entire SOFC stack and the sealing layer, and obtain the number of thermal cycles at the time of the creep damage of the sealing layer reaching a maximum or the maximum of the creep damage of the sealing layer at the time of reaching a set number of thermal cycles.

(4) Analysis is performed on the stress field of the sealing layer and the maximum of the creep damage of the sealing layer of the SOFC stack to determine the influence of the stress distribution and the creep damage of the sealing layer on the sealing performance. For the stress field of the sealing layer, the maximum stress should be ≤50 MPa; for the creep damage, when the maximum of the creep damage of the sealing layer reaches 0.99, the number of thermal cycles should be greater than the set number of thermal cycles (usually set to 20 cycles), or when the set number of thermal cycles is reached, the maximum of the creep damage of the sealing layer should be <0.99. If this condition is not satisfied, it indicates that the sealing performance of the sealing interface cannot satisfy the set requirements and thus the material blending ratio of the sealing layer needs to be adjusted.

Figure 7:
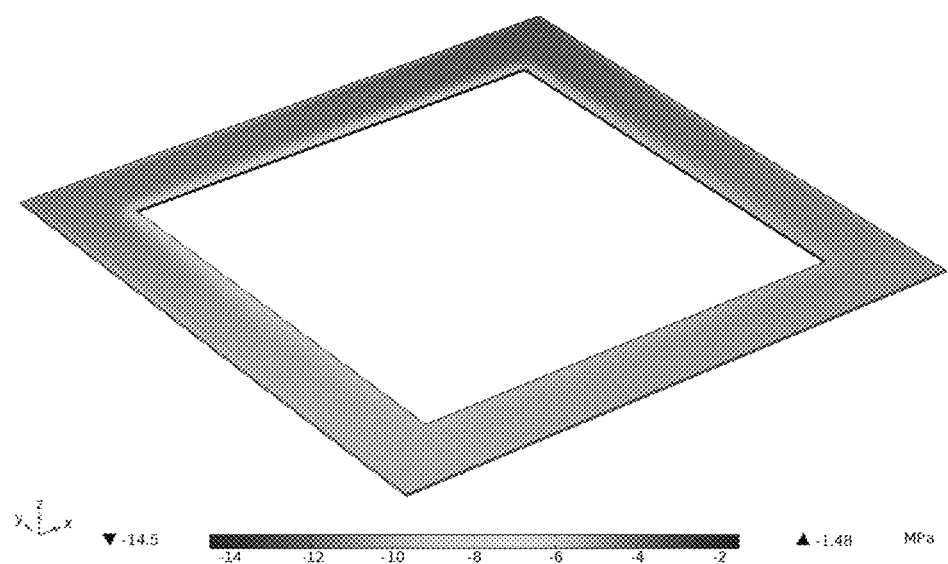
FIG. 7 is a stress distribution diagram illustrating a sealing layer of an SOFC stack with A10 sealing layer prepared in the embodiment 2 of the present disclosure.
Figure 8:
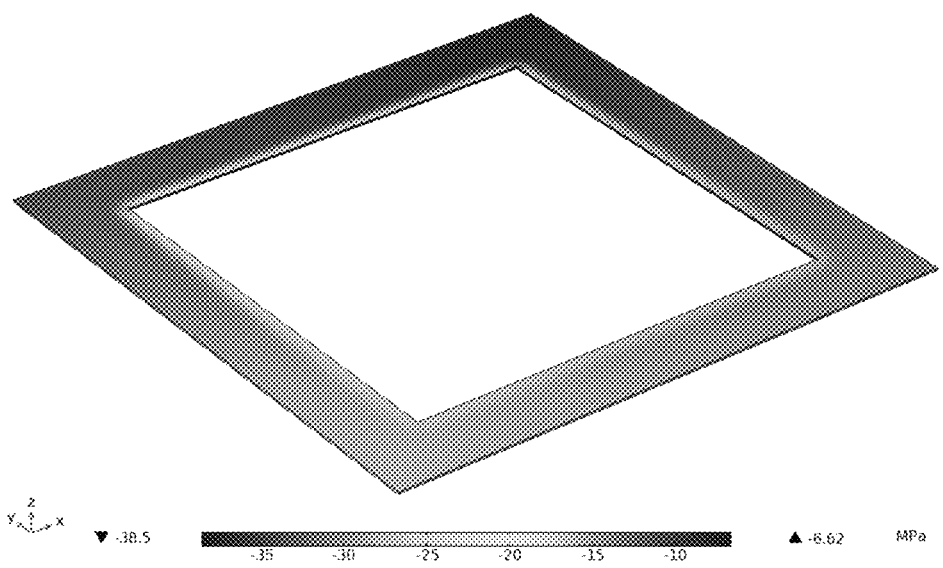
FIG. 8 is a stress distribution diagram illustrating a sealing layer of an SOFC stack with A0 sealing layer prepared in the embodiment 2 of the present disclosure.
Figure 9:
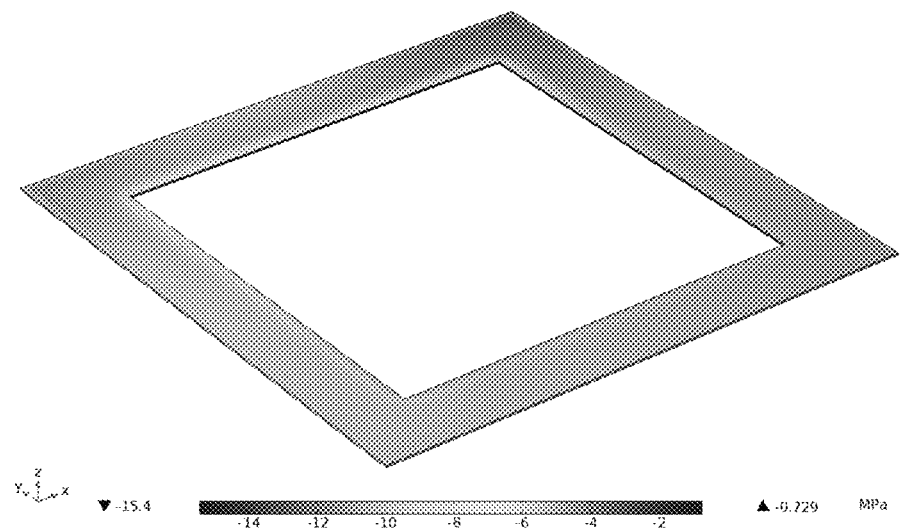
FIG. 9 is a stress distribution diagram illustrating a sealing layer of an SOFC stack with A5 sealing layer prepared in the embodiment 2 of the present disclosure.

In the embodiment 2, simulation is performed on the above A0, A5, A10 and A15 to obtain the stress field distributions of the sealing layer as shown in FIGS. 7, 8 and 9. FIG. 7 is the stress field distribution of the A10 sealing layer, FIG. 8 is the stress field distribution of the A0 sealing layer, and FIG. 9 is the stress field distribution of the A5 sealing layer. The maximum compressive stress result of each sealing layer and the number of thermal cycles at the time of the maximum 0.99 of the creep damage of each sealing layer are shown in Table 5.

TABLE 5

| Sealing layer type of single-layer stack | Maximum compressive stress of sealing layer | Number of thermal cycles at the time of the maximum = 0.99 of the creep damage of the sealing layer |
|---|---|---|
| A10 | 14.5 MPa | 56 |
| A0 | 38.5 MPa | 19 |
| A5 | 15.4 MPa | 23 |
| A15 | 25.4 MPa | 17 |

It can be seen from Table 5 that during the running process of the SOFC stack, the sealing layers will inevitably suffer compressive stress effect. Although the maximum compressive stresses of the above A10, A0, A5 and A15 sealing layers are all less than 50 MPa, the difference therebetween actually is very large. The A10 sealing layer suffers the smallest maximum compressive stress and the A0 sealing layer suffers the largest maximum compressive stress. The reason is that the A10 sealing layer is added with $V_2O_5$ and the ratios of $V_2O_5$ and SrO are controlled to enable the difference of the coefficient of thermal expansion of the sealing layer from those of the cell and the metal interconnector in to be small, and thus reduce the compressive stress of the SOFC stack due to mismatching of the coefficients of thermal expansion in the working process. In addition, within the running range of the SOFC stack, the crystallization process of the sealing layer can form crystal phase, which can aggravate the mismatching of the coefficients of thermal expansion of the glass phase and the crystal phase, thereby causing thermal stress concentration and cracks in the sealing layer in the thermal cycle of the SOFC stack. When the A10 sealing layer is added with $V_2O_5$, its crystallization temperature is obviously increased, which reduces the precipitation of the crystals of the sealing layer and further reduces the stress concentration of the sealing layer due to the difference of the coefficients of thermal expansion of the glass phase and the crystal phase. Furthermore, it is not good to add excess $V_2O_5$ because excess $V_2O_5$ can lead to more precipitation of the crystal phase, which increases the coefficient of thermal expansion of the entire material or roughens the microstructure of the material, leading to greater stress generated in the material at the time of temperature change and hence affecting its thermal stability. Excess $V_2O_5$ addition also can cause the conductivity and mechanical strength of the material to drop, as well as increasing the costs of the material.

Therefore, in the practical applications, it is required to optimize the addition amount of $V_2O_5$ by experiment to reach the optimal performance balance.

Furthermore, during the running process of the SOFC stack, the crystallization process of the sealing layer can generate the crystal phase and the generated crystal phase can gradually penetrate into the anode side, easily causing interface damage under the stress or external load. With the increase of the thermal cycles, the precipitation of the crystal phase leads to more holes and cracks in the sealing layer. Under the stress, the cracks gradually expand and especially, the crystal phase region is easier to damage, finally resulting in fracturing of the sealing layer. Due to high crystallization temperature, the A10 sealing layer remarkably reduces the precipitation of the crystal phase, and therefore reduces the generation of holes and cracks, further improving the sealing performance of the sealing layer.

Furthermore, for the creep damage of the sealing layer, when the maximum of the creep damage of the A10 and A5 sealing layers reaches 0.99, the number of thermal cycles exceeds 20; the number of thermal cycles of A10 reaches 56 noticeably higher than that of A5, which indicates A10 has the optimal sealing performance.

It should be noted that the parts not mentioned in the present disclosure can be implemented by employing the existing technologies.

Of course, the above descriptions are not intended to limit the present disclosure and the present disclosure is also not limited to the above examples. Any changes, variations, additions or replacements made by those skilled in the arts within the essence scope of the present disclosure shall fall within the scope of protection of the present disclosure.

The invention claimed is:

1. A preparation method of a solid oxide fuel cell (SOFC) or solid oxide electrolysis cell (SOEC) with a long-life sealing interface, comprising the following steps:

at step S1, determining a structure and a geometric size of an SOFC or SOEC stack and a composition material of each layer of structure, and preparing an SOFC or SOEC cell;

at step S2, selecting a substrate and a coating material of a metal interconnector and preparing the metal interconnector and applying a protective coating on a surface of the metal interconnector, Staged thermal treatment is performed on the metal interconnector coated with the protective layer; the coating material is a spinel oxide, the spinel oxide is at least one of nickel iron spinel, cobalt iron spinel, and manganese iron spinel;

at step S3, based on material components and a blending ratio of a sealing layer, preparing the sealing layer of $SiO_2$—MgO—$Al_2O_3$—SrO—$V_2O_5$ system;

at step S4, preparing the SOFC or SOEC stack by stacking and assembling a plurality of cell units formed by the sealing layer, the cell and the metal interconnector, and then pressurizing and heating for interface sealing to obtain the SOFC or SOEC stack with the long-life sealing interface;

at step S5, carrying out continuous running test and thermal cycle test on the SOFC or SOEC stack prepared in the step S4 and evaluating the stability and reliability of the stack under continuous running and thermal cycle;

the sealing layer in the step S3 comprises the following components with the following molar mass ratios: $SiO_2$ 45 to 50%, MgO 25 to 30%, $Al_2O_3$ 10 to 15%, SrO 8 to 12%, $V_2O_5$ 8 to 10%, totaling 100%;

a coefficient-of-thermal-expansion difference of the sealing layer from the slice and the metal interconnector in the step S3 is ≤30%;

Further comprising the steps of:

a sealing interface-based SOFC or SOEC stack multi-physical field calculation model is established based on the materials of the cell, the metal interconnector and the sealing layer determined in the steps S2, S2 and S3, and the temperature and stress distribution law, the creep strain and the creep damage of each part in the stack are analyzed, and whether the sealing performance of the sealing interface satisfies the set requirements is evaluated; If the set requirements are satisfied, the steps S4 and S5 are performed; if the set requirements are not satisfied, the step S3 is performed to adjust the material blending ratio of the sealing layer; Detailed descriptions are made below:

(1) Based on the structure of the SOFC or SOEC stack, the SOFC or SOEC stack multi-physical field calculation model coupling electrochemistry, heat transfer, flow and mass transfer is established by COMSOL Multiphysics finite element software; The material parameters and geometric parameters of the SOFC stack and the sealing interface are set, and a control equation about electrochemistry, heat transfer, flow and mass transfer is set, and a boundary condition and assumption condition required for finite element simulation are set based on actual working conditions;

(2) Finite element simulation calculation is performed in the COMSOL Multiphysics finite element software to obtain the temperature field distribution of the entire SOFC or SOEC stack and the sealing layer;

(3) Based on the temperature field distribution obtained in the step (2), solid mechanics analysis is performed on the SOFC or SOEC stack to obtain the stress field distribution of the entire SOFC stack and the sealing layer, and obtain the number of thermal cycles at the time of the creep damage of the sealing layer reaching a maximum or the maximum of the creep damage of the sealing layer at the time of reaching a set number of thermal cycles;

(4) Analysis is performed on the stress field of the sealing layer and the maximum of the creep damage of the sealing layer of the SOFC or SOEC stack to determine the influence of the stress distribution and the creep damage of the sealing layer on the sealing performance; For the stress field of the sealing layer, the maximum stress should be ≤50 MPa; for the creep damage, when the maximum of the creep damage of the sealing layer reaches 0.99, the number of thermal cycles should be greater than the set number of thermal cycles, or when the set number of thermal cycles is reached, the maximum of the creep damage of the sealing layer should be <0.99; If this condition is not satisfied, it indicates that the sealing performance of the sealing interface cannot satisfy the set requirements and thus the material blending ratio of the sealing layer needs to be adjusted.

2. The preparation method of the SOFC or SOEC with the long-life sealing interface according to claim 1, wherein the substrate of the metal interconnector in the step S2 is 430 stainless steel or Crofer 22 APU.

3. The preparation method of the SOFC or SOEC with the long-life sealing interface according to claim 1, wherein a leakage rate of the sealing layer in the step S3 under an SOFC or SOEC working temperature is <0.04 sccm·$cm^{-1}$.

4. The preparation method of the SOFC or SOEC with the long-life sealing interface according to claim 1, a resistivity of the sealing layer in the step S3 under the SOFC or SOEC working temperature is ≥$10\times10^{11}$ Ω·m;

a glass transition temperature of the sealing layer in the step S3 is less than the SOFC or SOEC working temperature, with a temperature difference within 30%;

a softening temperature of the sealing layer in the step S3 is higher than the SOFC or SOEC working temperature;

a crystallization temperature of the sealing layer in the step S3 is higher than the softening temperature of the sealing layer.

5. The preparation method of the SOFC or SOEC with the long-life sealing interface according to claim 1, wherein the step S5 comprises the following steps:

at step S51, thermal cycle test and continuous running test are performed on the SOFC or SOEC stack prepared in the step S4 to respectively monitor a change curve of temperature, voltage and current over running time in the thermal cycle and continuous running process, and one detection is performed on open-circuit voltage, polarization curve and electrochemical impedance spectroscopy of the SOFC or SOEC stack at an interval of one thermal cycle or 100*h* continuous running;

at step S52, based on the data recorded in the step S51, an end of life of the stack is determined; firstly, based on the polarization curve and the electrochemical impedance spectroscopy data, a service number of thermal cycles or continuous running time corresponding to the voltage attenuating to an end-of-life threshold under a rated working current density is determined as its life; secondly, based on the open-circuit voltage of the SOFC or SOEC stack, the leakage rate in the service process is calculated and whether the leakage rate is in compliance with <0.04 sccm·$cm^{-1}$ in each detection is evaluated; if in compliance, the test is continued; if not in compliance, the service number of thermal cycles or continuous running time of the SOFC or SOEC stack is recorded as its life, and a minimum thereof is selected as its end of life;

at step S53, whether the service number of thermal cycles and the continuous running time recorded in the step S52 satisfy set requirements is determined; if yes, it indicates that the stability and reliability of the SOFC or SOEC stack under the continuous running and thermal cycle are evaluated as qualified; if not, it indicates that the stability and reliability of the SOFC or SOEC stack under the continuous running and thermal cycle are evaluated as disqualified.

6. An SOFC or SOEC with a long-life sealing interface, obtained by using the preparation method of claim 1.

* * * * *